Feb. 16, 1971  D. E. SETTLE  3,562,888
METHOD FOR FABRICATING AN IMPROVED PULLEY
Filed Dec. 20, 1968  2 Sheets-Sheet 1

INVENTOR
DONALD E. SETTLE
BY
Hood, Gust, Irish & Lundy
ATTORNEYS

Feb. 16, 1971    D. E. SETTLE    3,562,888
METHOD FOR FABRICATING AN IMPROVED PULLEY
Filed Dec. 20, 1968    2 Sheets-Sheet 2

INVENTOR
DONALD E. SETTLE
BY
Hood, Gust, Irish & Lundy
ATTORNEYS 3,562,888
METHOD FOR FABRICATING AN IMPROVED PULLEY
Donald E. Settle, Hope, Ind., assignor to The Reliance Electric and Engineering Company, Cleveland, Ohio, a corporation of Ohio
Filed Dec. 20, 1968, Ser. No. 785,487
Int. Cl. B21d 53/26; B21k 1/28, 1/47
U.S. Cl. 29—159                                                19 Claims

ABSTRACT OF THE DISCLOSURE

The method of fabricating a V-pulley disc which comprises the steps of providing a metal hub element, providing a substantially flat disc of ductile metal having a central perforation proportioned and designed to receive the hub element, entering the hub element in the perforation and there welding it, and thereafter spinning the disc to frusto-conical shape by pressure exerted generally axially upon one of its faces. The hub element may be welded to the disc by electron beam welding techniques or by inertia welding techniques. The spinning step subsequent to the welding step serves to form properly a conical disc, to harden the belt-engaging surface of the disc, and to check the weld between the disc and hub element.

---

It is a primary object of my invention to provide a method of fabricating improved V-pulley discs, which method comprises the steps of providing a metal hub element, providing a substantially flat disc of ductile metal having a central perforation proportioned and designed to receive the hub element, entering the hub element in the perforation and there welding it. After the hub element and disc are welded, the disc is formed by a metal spinning process to a frustoconical shape by pressure exerted generally axially upon one of its faces. I prefer to weld the hub element to the disc by using electron beam welding techniques or by using inertia welding techniques. It will be appreciated, as this description progresses, that the spinning step, which is subsequent to the welding step, serves properly to form a conical disc against which a belt may operate, to harden the belt-containing surface of the disc, and to check or test the weld between the disc and the hub element.

I have found that, by using my combination welding and spinning method, I can fabricate V-pulley discs which are comparable in quality to V-pulley discs which are fabricated by conventional casting processes. In fact, using my method, I can fabricate V-pulley discs at a cost approximately equal to one-half the cost of cast ductile iron V-pulley discs.

I prefer to use either an electron beam welding technique or an inertia welding technique for joining, i.e., welding, a flat ductile metal disc to a hub element. For reasons which will become apparent as this description progresses, each of these welding techniques produces a weld which is difficult if not impossible visually to inspect. I have discovered that the forces and stressing involved in my spinning operation, which is subsequent to the welding operation, are sufficient to check the integrity of the weld between the hub element and the disc. Specifically, if the weld is not properly made, the spinning operation will cause fracture of the weld.

Another advantageous feature of the spinning operation of my method is that the spinning tends to work harden the belt-engaging surface of the disc. In fact, I have found that, for instance, a steel disc having a hardness of Rockwell C–21 will, after the spinning operation, have a hardness of Rockwell C–27 to C–30.

Another advantageous feature of the spinning step of my method is that it results in a frusto-conical surface which has much better run out characteristics than is obtainable with other processes for forming a flat sheet into a conical shape.

Another object of my invention is to provide such a method including the steps of welding, with electron beam welding techniques, a substantially flat metal disc to a metal hub element and then spinning the disc to a frusto-conical shape.

Still another method of my invention is to provide such a method which includes the steps of welding, with inertia welding techniques, a substantially flat metal disc to a metal hub element and then spinning the disc to a frusto-conical shape.

To the accomplishment of the above and related objects, the method of my invention may be practiced as described herein and as illustrated in the accompanying drawings, attention being called to the fact, however, that the description and drawings are merely illustrative and that changes may be made as long as the scope of the appended claims is not violated.

Figure 1:
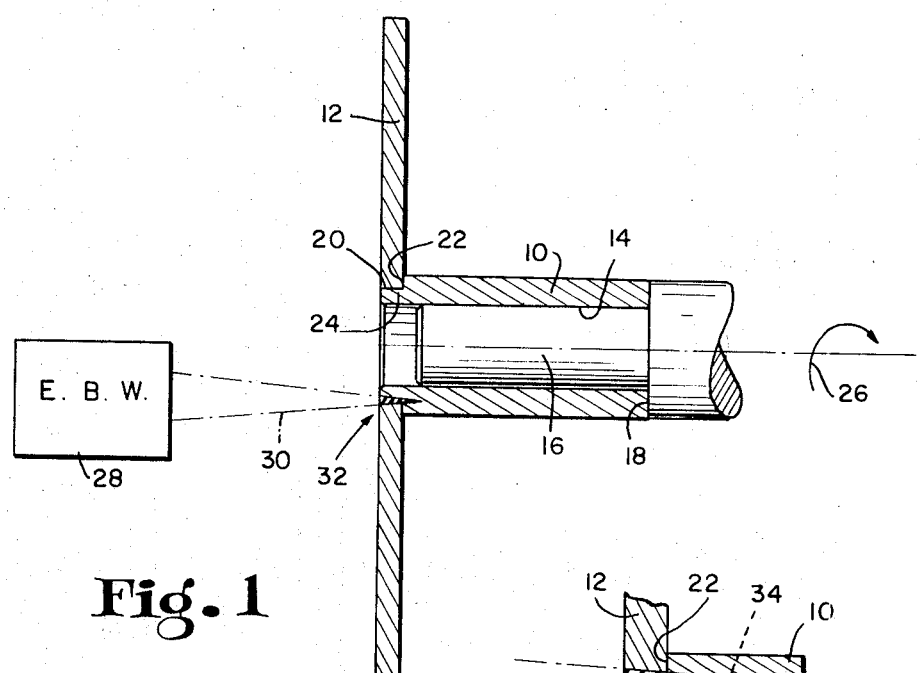
FIG. 1 is a sectional and somewhat diagrammatical view showing the manner in which a flat disc may be welded to a hub element by electron beam welding techniques.
Figure 2:
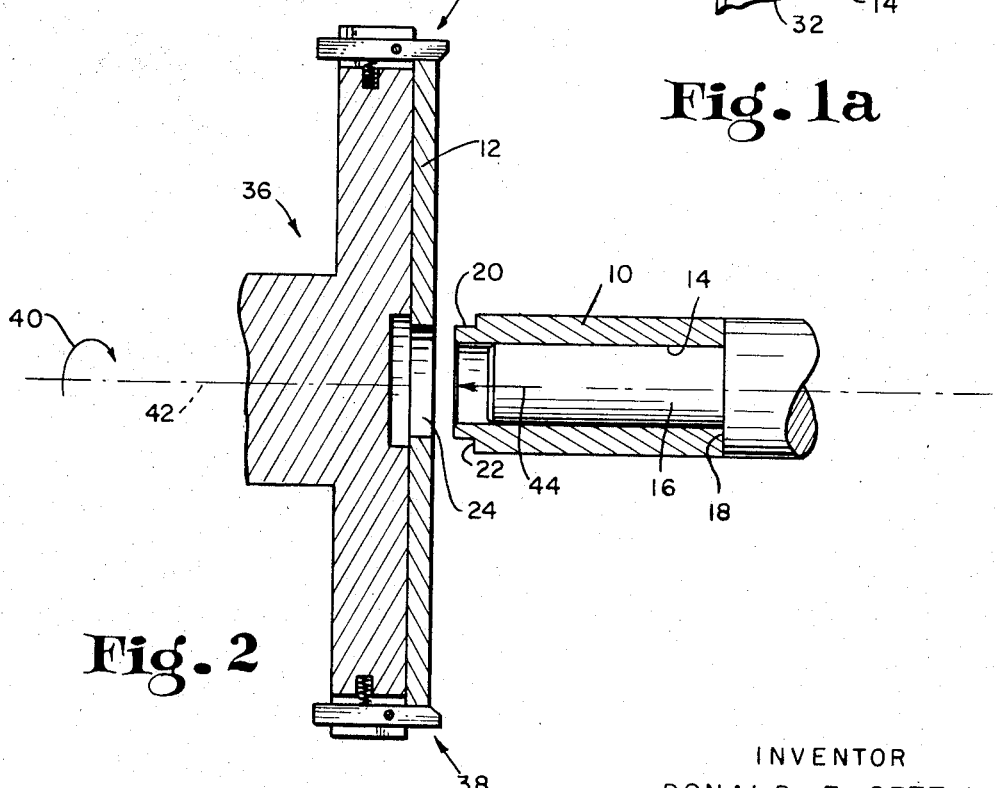
FIG. 2 is a similar view showing the manner in which a metal disc may be welded to a hub element using inertia welding techniques.

Referring now to the drawings, and particularly to FIGS. 1 and 2, it will be seen that I have illustrated a hub element 10 and a substantially flat circular disc 12. Preferably, the hub element 10 and disc 12 will be fabricated from metal so that they can be joined by welding processes. For instance, in fabricating one type of V-pulley disc, I prefer that the hub element 10 be fabricated from C 1018 cold drawn steel and that the disc 12 be stamped from C 1010 hot rolled plate preferably aluminum kilned to facilitate welding, i.e., to eliminate gases. It will be appreciated, however, that the hub element 10 and disc 12 can be fabricated from any suitable metal.

The illustrated hub element 10 (FIGS. 1 and 2) is provided with an axial bore 14 into which a mandrel 16 can be inserted, the illustrated mandrel being provided with a radially enlarged shoulder 18 against which the right-hand end of the hub element abuts. The left-hand end of the hub element 10 is provided with a terminal extension 20 defined by a radially-enlarged shoulder 22. The disc 12 is provided with a central perforation or opening 24 which is proportioned and designed snugly to receive the extension 20 of a hub element 10.

In FIG. 1, I have illustrated my electron beam welding technique for securely joining the disc 12 to the hub element 10. The hub element 10 with the disc 12 mounted on the terminal extension 20 as illustrated is placed on the mandrel 16 so that the hub element and disc can be rotated about the axis of the hub element as indicated by the arrow 26. In some cases, it may be desirable for the hub element 10 to rotate relative to the mandrel 16 and in other cases, it may be desirable to rotate the mandrel with the hub element mounted thereon. Further, the bore 14 may or may not be provided with a keyway (not shown) registering with a keyway (not shown) on the mandrel 16, whereby the hub element 10 can be drivingly connected to the mandrel by a key.

Figure 1A:
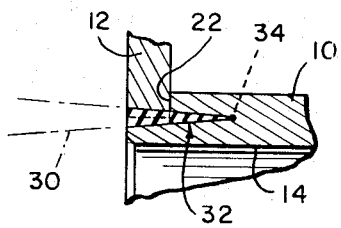
FIG. 1a is a view showing the weld between a metal disc and a hub as formed by electron beam welding techniques.

A conventional electron beam welded, indicated by the reference numeral 28, is arranged to direct an electron beam 30 at the peripheral edge of the central perforation 24 in the disc 12 and the peripheral portion of the extension 20 which is, of course, in contact with the peripheral edge of the perforation 24. I prefer that the beam 30, i.e., the axis of the beam 30, be directed generally parallel to the axis of the hub element 10 and that the beam be focused at a point 34 (FIG. 1a) which is just slightly rearwardly of the shoulder 22, i.e., to the right of the shoulder 22 as illustrated in FIG. 1a, to provide a weld approximately as indicated at 32. Now, since the beam 30 is preferably stationary and directed generally parallel to the axis of the hub element 10, rotation of the hub element and disc 12 as indicated by the arrow 26 provides a weld having a cross section as indicated at 32 and extending uniformly about the peripheral edge of the perforation 24.

It can be seen that, in FIG. 1, the disc 12 abuts the shoulder 22 and is therefore positioned axially by the shoulder. Preferably, the outer diameter of the extension 20 is proportioned and designed snugly to fit into the central perforation 24 of the disc 12, thereby radially to position the disc relative to the hub element 10.

As clearly shown in FIG. 1a, most of the weld 32 is hidden and, consequently, cannot be visually inspected.

In FIG. 2, I have illustrated the manner in which inertia welding techniques may be used to fasten securely the disc 12 to the hub element 10. In FIG. 2, the disc 12 is mounted in a chuck, indicated generally by the reference numeral 36, to be concentric with the hub element 10. I have illustrated the chuck 36 rather diagrammatically and it will be appreciated that any conventional type of chuck means may be used to support the disc 12. In other words, the type of chuck used is not pertinent to my invention and need not be discussed in detail herein. It will be seen, however, that the chuck 36 is provided with jaws 38 arranged to engage the outer periphery of the disc 12.

Inertia welding of the hub element 10 to the disc 12 involves providing relative rotation between the disc and the hub element and, during such relative rotation, jamming the extension 20 of the hub element into the perforation 24 of the disc. It will be apparent that, since the disc 12 abuts against the shoulder 22, jamming the extension 20 into the perforation 24 during such relative rotation will develop heat. If the velocity of the relative rotation is great enough and if the jamming force is great enough, sufficient heat will be developed to weld the disc 12 to the shoulder 22 of the hub element 10. Preferably, the fit between the extension 20 and the perforation 24 will be such that the extension will slip rather easily into the perforation. I find that .012–.015 inch clearance is suitable. In FIG. 2, for example, the chuck 36 and disc 12 can be rotated as indicated by the arrow 40 about the axis 42 which coincides with the axis of the hub element 10 and relative to the hub element 10. When the disc 12 is rotating at a predetermined and proper velocity, the mandrel 16 on which the hub element 10 is mounted can be moved as indicated by the arrow 44 to push the extension 20 of the hub element into the perforation 24.

Electron beam welding techniques and inertia welding techniques per se are well known and do not need to be described in greater detail in this description. Both techniques will securely fasten the flat metal disc 12 to the hub element 10.

Figure 3:
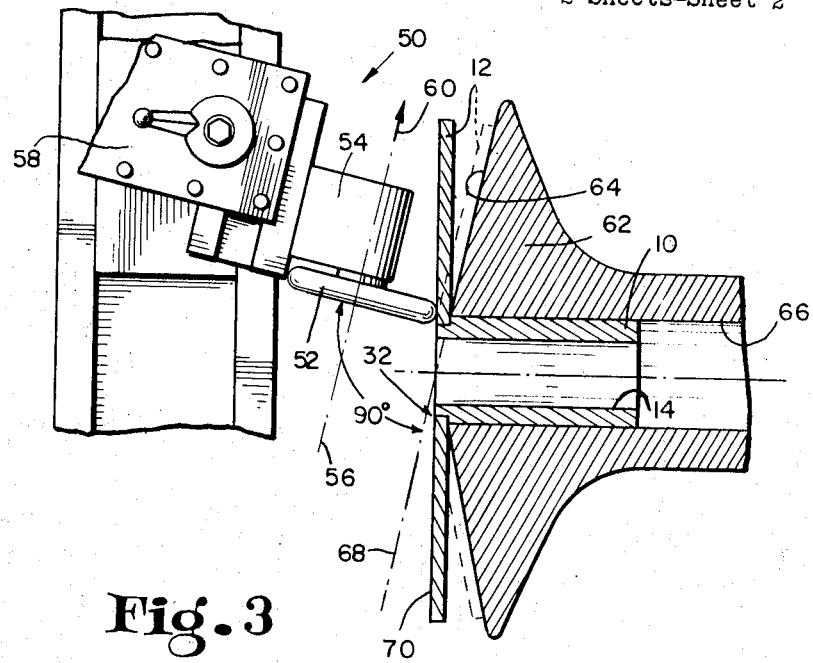
FIG. 3 is a sectional, somewhat diagrammatical view showing my preferred method of spinning the disc.
Figure 4:
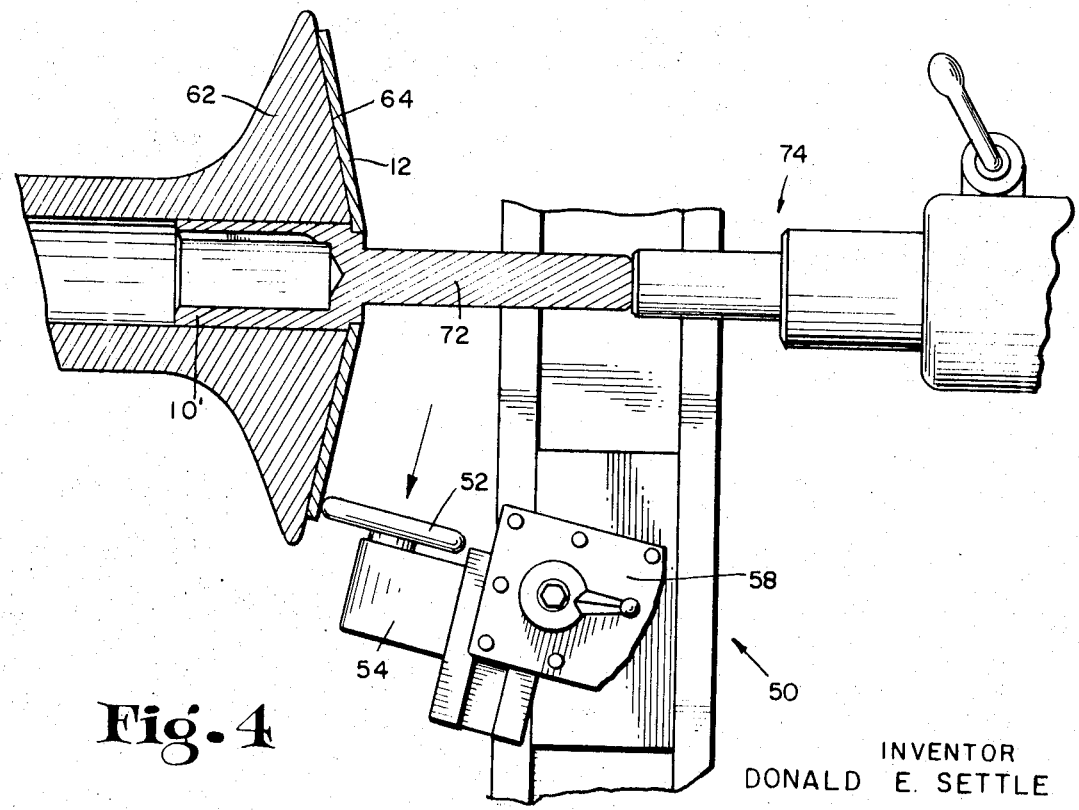
FIG. 4 is a sectional and somewhat diagrammatical view showing a V-pulley disc after the spinning step.

In accordance with the method of my invention, after a disc 12 is welded to a hub element 10 as described in conjunction with FIGS. 1 and 2, the disc is then formed in a metal spinning operation to a frusto-conical shape. During this metal spinning operation, pressure is preferably exerted upon the face of the disc 12 which is directed away from the shoulder 22 of the hub element 10. This pressure, which is exerted upon the disc 12 while the disc and hub element 10 are rotated about the axis of the hub element, applies a stress to the weld or welded connection between the disc and the hub element. The stressing of the weld will produce fissures and cracks if the weld is not properly made. Thus, the metal spinning operation of my method serves as an inspection or weld testing step. Referring now to FIGS. 3 and 4, the metal spinning operation will be further described.

In FIG. 3, I have illustrated a portion of a power spinning apparatus 50 including a work-engaging roller 52 which is journal mounted on a slider block 54 for rotation about an axis indicated at 56, the slider block 54 being mounted on a guide 58 for movement as indicated by the arrow 60, i.e., along the axis 56. An abutment element 62 which provides a conical surface 64 is mounted on the apparatus 50, the element 62 having a bore 66 for receiving a hub element 10 having a disc 12 welded thereto as discussed in conjunction with FIGS. 1 and 2. The disc 12, hub element 10 and abutment element 62 are rotated by the apparatus 50 about the axis of the hub element 10. It will be appreciated that some means must be provided for drivingly connecting the hub element 10 to the abutment element 62, but such a means is not a part of my invention and does not need to be discussed herein.

The angle of inclination of the conical surface 64 is preferably such that a line on the surface which is defined by a cutting plane which includes the axis of the hub element 10 and the axis 56, which line is indicated by the reference line 68, will be parallel to the axis 56 and perpendicular to the plane in which the roller 52 rotates. Thus, as the roller 52 is moved in the direction of the arrow 60 while the disc 12 is spinning, the disc will be formed against the surface 64 to have a frusto-conical shape corresponding to the suface. The power spinning or forming operation is started with the roller 52 in approximately the position shown in FIG. 3. The roller 52, which may have an outer peripheral surface of tool steel or the like, engages and acts against, i.e., applies an axial force to, the surface 70 of the disc 12 while the disc is spinning. The engagement of the roller 52 with the surface 70 during the spinning operation work hardens the surface 70 to make it more suitable as a belt-engaging surface. The stressing of the weld 32 which results from moving the roller 52 against the disc 12 while the disc is spinning is effective, if the weld is not satisfactory, to cause fissures and cracks in the weld.

Referring now to FIG. 4, it will be seen that I have shown a disc 12 after it is formed against the surface 64 of the abutment element 62. The disc 12 of FIG. 4 is welded to a hub element 10' which includes an axially extending portion 72 on which a hub element, such as the element 10 of FIG. 3, is mounted. Also in FIG. 4, I have illustrated the apparatus 50 as including means 74 for engaging the distal end of the portion 72 to restrain the hub element 10' from moving axially to the right (FIG. 4) during the spinning operation.

What I claim is:

1. The method of fabricating a V-pulley disc which comprises the steps of providing a metal hub element having a terminal extension defined by a radially-enlarged shoulder, providing a substantially flat disc of ductile metal having a central perforation proportioned and designed to receive said extension, entering said extension in said perforation and there welding it, and thereafter forming said disc to frusto-conical shape by pressure exerted axially upon its face which is directed away from said shoulder.

2. The method of claim 1 in which said forming step is accomplished by a spinning operation.

3. The method of claim 1 in which said forming step is accomplished by a power spinning operation.

4. The method of claim 1 in which said welding step is accomplished by an inertia welding operation.

5. The method of claim 2 in which said welding step is accomplished by an inertia welding operation effective to face weld said disc to said shoulder.

6. The method of claim 3 in which said welding step is accomplished by an inertia welding operation.

7. The method of claim 1 in which said welding step is accomplished by an electron beam welding operation.

8. The method of claim 2 in which said welding step is accomplished by an electron beam welding operation.

9. The method of claim 3 in which said welding step is accomplished by an electron beam welding operation.

10. The method of fabricating a V-pulley disc which comprises the steps of providing a metal hub element, providing a substantially flat disc of ductile metal having a central perforation proportioned and designed to receive said hub element, entering said hub element in said perforation and there welding it, and thereafter spinning said disc to frusto-conical shape by pressure exerted generally axially upon one of its faces.

11. The method of claim 10 in which said spinning step includes placing said disc against a frusto-conically shaped abutment element, rotating said disc and hub element and said abutment element about the axis of said hub element, and spinning said disc against the frusto-conical surface of said abutment element.

12. The method of claim 10 in which said welding step includes providing relative rotation between said disc and said hub element and in which said entering step includes, during such relative rotation, jamming said hub element into said perforation to develop heat sufficient to weld said disc to said hub element.

13. The method of claim 12 in which said spinning step includes placing said disc against a frusto-conically shaped abutment element, rotating said disc and hub element and said abutment element about the axis of said hub element, and spinning said disc against the frusto-conical surface of said abutment element.

14. The method of claim 10 in which said welding step includes directing an electron beam at the peripheral edge of said perforation and the peripheral portion of said hub element contacting said peripheral edge and rotating said hub element and said disc relative to said beam and about the axis of said hub element to provide a weld extending uniformly about said peripheral edge.

15. The method of claim 14 in which said electron beam is directed generally parallel to the axis of said hub element.

16. The method of claim 14 in which said spinning step includes placing said disc against a frusto-conically shaped abutment element, rotating said disc and hub element and said abutment element about the axis of said hub element, and spinning said disc against the frusto-conical surface of said abutment element.

17. The method of claim 9 in which said welding operation includes the steps of directing a conically-shaped beam axially inwardly toward said shoulder with the beam including an outer peripheral portion of said terminal extension and an inner peripheral portion of said central perforation and rotating said disc and said hub element about the axis of said hub element.

18. The method of claim 17 in which said beam is focused at a point disposed axially inwardly from said shoulder.

19. The method of claim 14 in which said beam is a generally conically-shaped beam directed axially relative to said hub element with the axis of said beam coinciding with the peripheral surface of said peripheral portion of said hub element.

References Cited

UNITED STATES PATENTS

| | | | |
|---|---|---|---|
| 1,266,579 | 5/1918 | Garcelon | 74—230.8 |
| 1,728,002 | 9/1929 | Nelson | 72—83 |
| 2,620,675 | 12/1952 | Meadows et al. | 29—159X |
| 3,258,576 | 6/1966 | Schleich et al. | 219—121X |
| 3,458,683 | 7/1969 | Canonico et al. | 219—121 |
| 3,465,545 | 9/1969 | Stamm | 29—470.3X |

FOREIGN PATENTS

| | | | |
|---|---|---|---|
| 665,954 | 2/1952 | Great Britain | 29—159 |

JOHN F. CAMPBELL, Primary Examiner

V. A. DIPALMA, Assistant Examiner

U.S. Cl. X.R.

72—83; 74—230.8; 219—121